United States Patent [19]
Schwab et al.

[11] 3,752,449
[45] Aug. 14, 1973

[54] APPARATUS FOR MIXING AND CONVEYING MATERIALS

[75] Inventors: Johann Schwab, Vienna; Albert Zehner, Pfaffstatten; Egon Kratochvil, Modling, all of Austria; Friedrich Walter, Bremen, Germany

[73] Assignee: Semperit Aktiengesellschaft, Vienna, Austria; Desona-Werke GmbH, Postfach, Achim, Germany

[22] Filed: Dec. 4, 1970

[21] Appl. No.: 95,181

[30] Foreign Application Priority Data
Dec. 17, 1969 Austria............................ A11752/69

[52] U.S. Cl. ................................................. 259/191
[51] Int. Cl. ................................................. B01s 7/08
[58] Field of Search ........................ 259/2, 5, 9, 10, 259/12, 21, 35, 40, 25, 26, 191, 193

[56] References Cited
UNITED STATES PATENTS

| | | | |
|---|---|---|---|
| 3,164,375 | 1/1965 | Frenkel.............................. | 259/9 X |
| 3,023,455 | 3/1962 | Geier et al......................... | 259/2 X |
| 3,347,528 | 10/1967 | List et al............................ | 259/2 |

FOREIGN PATENTS OR APPLICATIONS

| | | | |
|---|---|---|---|
| 518,752 | 11/1955 | Canada................................ | 259/9 |

*Primary Examiner*—John Petrakes
*Assistant Examiner*—Philip R. Coe
*Attorney*—Werner W. Kleeman

[57] ABSTRACT

An apparatus for mixing and conveying at least two materials, in particular a two or more component synthetic resin system comprising means defining at least one mixing compartment having an inner wall. At least one material conveying- and agitation worm means is arranged in the mixing compartment, said worm means and the inner wall of said mixing compartment surrounding said worm means at least partially possessing a conical configuration. There is also provided means for moving said worm means and mixing compartment relative to one another in axial direction. This invention also teaches a novel worm construction for use in such mixing compartment which comprises a worm element consisting of a number of worm sections arranged in a row next to one another in the axial direction of the worm element, at least one worm section possessing threads with a different pitch than the remaining worm sections and the number of threads of all worm sections being equal.

13 Claims, 14 Drawing Figures

APPARATUS FOR MIXING AND CONVEYING MATERIALS

BACKGROUND OF THE INVENTION

The present invention relates to a new and improved apparatus for mixing and conveying at least two materials, preferably in liquid state, especially a dual- or multicomponent synthetic resin system, which apparatus embodies at least one mixing compartment or chamber and at least one transport and agitator worm element.

The prior art is familiar with the technique of mixing together liquid components of a synthetic resin mixture in a mixing compartment in which there is arranged a rotating worm or spindle. This worm serves to both admix the components as well as also to transport such mixture out of the mixing compartment. This worm is constructed in the form of a single- or multi-pitch spindle, wherein the cross-sectional configuration of the individual threads are appropriately constructed in accordance with the properties of the components to be mixed together. Furthermore, the worm possesses a certain play with regard to the inner wall of the mixing compartment. It has been found that, for instance, when using polyurethane synthetic resins an optimum mixing effect can be achieved if there is provided a play of 0.1 mm. Since the worm rotates quicker than the material discharged due to the conveying action, there can be achieved the effect that during transport of the material always a portion of the mixture flows back from one thread to the next successive thread between this narrow area of play or space intermediate the outer wall of the worm and inner wall of the mixing compartment, thereby producing the mixing effect or action. The flanks of the threads are more or less inclined in accordance with the viscosity of the material. When working with components possessing a high viscosity it is therefore advantageous to employ a worm or spindle, the flanks of the threads of which are only slightly inclined with respect to the lengthwise axis of the worm.

Furthermore, with prior art equipment of this type upon closing of the infeed line for the components the worm continues to rotate and transports the remainder of the material out of the mixing compartment. However, it has been found that only such material can be conveyed away which is actually acted upon or reached by the worm. Hence, in the space between the worm and the mixing compartment wall there always remains a certain residual material which adheres to the mixing compartment wall.

Additionally, when admixing together materials which react into a solid body or mass the gap mentioned above, closes with time in the direction of the worm, until finally the worm only has a very small area of play. Since, now, the gap required for the mixing action has been shifted, the mixing effect itself is considerably impaired. Accordingly, it is necessary to periodically clean the mixing compartment, resulting in a great expenditure of time and work.

Furthermore, in order to obtain a sufficient admixing of the components, the worm and therefore also the mixing compartment must exhibit a certain length. If the equipment performs a discontinuous operation in that, for each repeating interruption there should be produced a certain quantity or batch of mixture and, for instance, introduced or injected into a mold in this condition, then additionally there occurs a relatively great loss of material. Upon completion of the injection operation, the valves are closed so that the mold can be filled with an exact prescribed quantity of material. If there is a premature closing of the mold, air can enter into the mold. However, the agitator or worm element, after interruption of the infeed of the mixture components, continues to travel and transports the remainder of the mixture out of the mixing compartment. Due to these measures there occurs, after each mixing and injection period, a selfcleaning of the mixing compartment. By virtue of such, the material losses mentioned above result.

In the case of worms supported or mounted at only one end, difficulties can occur wih the bearings or supports, especially if such worms possess considerable length. The worm rotates at a relatively high rotational speed, thus, even the slightest imbalance can lead to destruction of the equipment.

SUMMARY OF THE INVENTION

Accordingly, there is a real need in the art for apparatus for mixing and conveying materials which is not associated with the aforementioned drawbacks of the prior art constructions. A primary object of the present invention is to provide a novel construction of mixing apparatus which is not associated with the aforementioned disadvantages of the prior art equipment.

Another, more specific object of the present invention is to provide an improved mixing apparatus in which the maintenance requirement noted above with regard to the state-of-the-art equipment is extensively avoided.

Still a further significant object of the present invention relates to the provision of improved mixing equipment wherein the mixing compartment is designed in a manner to possess smaller dimensions than the prior art equipment while at the same time still realizing at least as good a mixing effect with such lesser dimensioned hardware.

As explained above, one significant aspects of this invention is concerned with considerably reducing the maintenance requirements of the mixing and conveying equipment. Now, according to the invention such can be achieved by providing a mixing apparatus of the mentioned type in which the worm and the surrounding portions of the wall of the mixing compartment are constructed to be at least partially conical and movable relative to one another in the axial direction. Due to these measures there is produced a gap in one terminal position of the worm between it and the housing, which gap is reduced in size or narrowed in the other terminal position at the conical section, and wherein the worm is capable of scrapping and transporting away residual material from the mixing chamber wall to such degree as defined or determined by both terminal positions of the relative movement.

Furthermore, in this connection the core of the worm can be of cylindrical configuration so that the thread volume reduces in the direction of the cone. But, however, the worm core can also be constructed to possess the same inclination as the worm, or can possess an inclination or slope different from the inclination of the worm. With the same inclination the thread volume of the worm reduces in the direction of the cone only by virtue of the cross-section becoming narrower due to the cone, whereas with a less pronounced inclined or cylindrical worm core the thread volume reduces considerably more than the reduction of the cross-section of the mixing compartment due to the cone.

In the last-mentioned situation, while retaining the cylindrical configuration of the worm core it is possible to achieve the conicity of the worm in that a cylindrical worm is conically machined at its outside or surface according to the desired inclination angle. In this case, due to the reduction of the thread volume not only will the conveying action in the direction of the worm cone be smaller, but furthermore there is an alteration in the relationship of the conveying action with respect to the mixing action in favor of the mixture appearing in the gap between the housing wall and the surface of the worm, since the material is then subjected to pronounced internal frictional forces. The thus occurring shearing- or squeezing action favors the mixing effect and heats-up the material.

Apart from the conveying action in the direction of the rotating worm threads, it should be noted that due to the conical construction of the worm there is also achieved a force or pressure which acts in a direction towards the cone due to centrifugal conditions. Consequently, within the mixing compartment there appears an additional build-up of pressure, reducing the conveying action and therefore improving the mixing action. However, in order to more quickly transport away the material from the inlet or infeed openings for the components into the mixing compartment it can be advantageous for reasons of construction to design the worm and the mixing compartment wall to be cylindrical at the region of the mouth portions of such inlets for the materials or components. As a result, it is possible at this region to maintain very small and also constant the gap between the worm and the mixing component wall.

The inclination of the conical section is to be advantageously chosen as a function of the desired conveying and mixing efficiency or capacity, the viscosity of the material, and the required length and average diameter of the apparatus. The pitch can possess an angle of about 1° to about 20°, preferably about 3° to about 8°. With a cone having a smaller inclination also with a small gap there will be necessary a larger path for the worm- and housing movement.

With very slight inclination the tolerance of the gap can be more likely designed to be somewhat over-dimensioned or generously calculated due to an exact determination of the terminal points of the movement, whereas in any case for especially small gap widths there exists the danger of jamming or binding of both components movable relative to one another. In the case of a cone having a larger inclination there is required, in the opposite sense, a much greater accuracy in the gap tolerance, whereas the danger of binding of both relatively movable components is extensively eliminated.

In the case of a mixing head for relatively thin-liquid mixtures of polyurethane-forming synthetic resin components the gap between both terminal positions should be adjustable, for instance, in a range of about 0.05% and about 5 percent, preferably about 0.2 percent to about 2 percent of the average compartment diameter. For instance, with a cone of about 3° the value of 0.2 percent should not be fallen below, otherwise the danger exists that both components will bind and the apparatus will be damaged. With the minimum value, resulting in an absolute gap width of 0.02 mm or less, consideration should further be given to the fact that the worm must be mounted practically free of play. Upon exceeding the gap width of about 2 percent, on the other hand, the mixing effect begins to drop, since then there must be reckoned with the occurrence of only laminar flow.

Both the mixing compartment as well as the worm bearing means can possess external threading and can be seated by means of their threading in an internal threading of a housing. By rotating the housing or the section seated thereat it is possible to achieve a movement of the last-mentioned component in the axial direction.

However, for this movement there can also be resorted to the use of a known cam or rocker arm control. In such case, there is provided, for instance, in one component of the mixing head a curve-shaped groove into which engages a pin of the other component. As a result, it is possible for instance to transform a rotational movement into an axial movement. The actuating mechanism can be constituted by a known hydraulic or pneumatic cylinder arrangement.

It has been found that the worm should not be moved too quickly towards the mixing compartment wall. Therefore, it is advantageous to provide for this movement component a suitable throttling mechanism. The worm and the mixing compartment wall should remain at the position of the smallest spacing with respect to one another for about 0.5 to about 5 seconds. Generally, this time is sufficient to adequately clean the mixing compartment.

At this point it might be remarked that the material within the mixing compartment is conveyed essentially along a helical line from the infeed opening or openings for the individual components of the material to the outfeed or discharge opening as a function of the rotational speed of the worm, the cross-sectional configuration and the pitch or slope of the threads, on the one hand, and the viscosity of the mixture, on the other hand. Accordingly, it is necessary to influence this direction of movement in order to achieve an additional turbulence or agitation of the mixture, thereby to improve the mixing action.

Now according to a still further manifestation of the present invention used in connection with the heretofore explained design of mixing equipment, this can be achieved by providing a worm construction manifested by the features that, it consists of a number of sections which are arranged in series after one another in the axial direction thereof. Moreover, at least one section of the worm possesses treads with a different pitch than the remaining sections and that the number of threads of all sections is equal. Due to these measures the direction of motion of the mixture is altered a number of times, so that especially at these locations where the individual worm sections bear against one another there occurs an additional agitation or turbulence. By suitably selecting the pitch of the threads it is possible to either achieve an acceleration or deceleration in the movement of a portion of the mixture. Determination of this pitch, in the first instance, is dependent upon the viscosity of the mixture.

In order to prevent daming-up of the material in the transition zone from one section of the worm to the other, it is necessary that the end of the thread of one section exactly merges or fits with the beginning of the thread of the next successive worm section. To prevent a mutual offset of such thread sections, it is advantageous if the number of threads of all of the sections is the same. Thus, for instance, if the first section of the worm has two threads, then all the successive or following sections likewise must possess two threads. Due to this design there is ensured for a continuation of the threads throughout all sections of the worm. To prevent rotation of the individual sections relative to one another, such can be mounted by means of a suitable fitting spring or the like upon a common worm shaft.

Furthermore, to ensure for sufficiently great deflection of the stream of material and therefore to ensure for a sufficiently intensive agitation, it is advantageous if the length of the individual sections at least corresponds to the spacing of one thread with respect to the other as viewed in the axial direction.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
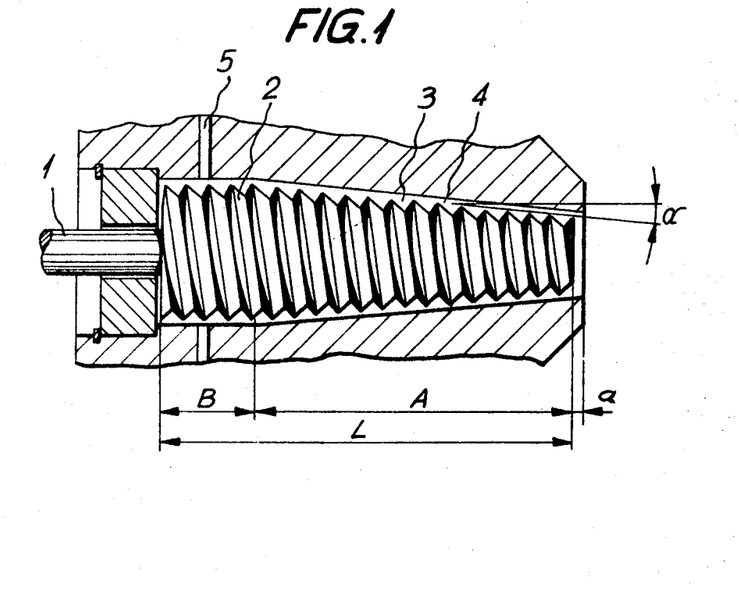
FIG. 1 is a longitudinal sectional view of a first embodiment of inventive material mixing and conveying apparatus embodying a preferred form of inventive stirrer or mixing worm arranged in a mixing compartment.

Describing now the drawings, the worm 1 depicted in FIG. 1 will be seen to embody a cylindrical section 2 which in the direction of material conveying or transport merges with conical section 3. Worm 1 is adjustable within mixing compartment or chamber 4 in the axial direction through the distance $a$. Moreover, both the worm 1 and the mixing compartment 4 can be also constructed such that the forward end of the worm, when it assumes its cleaning position, extends by the distance $a$ or a fraction of this distance out of the mixing compartment 4. The mixing compartment 4 itself is designed in such a manner that in one terminal position, the cleaning position of FIG. 2, there is obtained essentially the same small gap width $d$ both at the cylindrical worm section 2 as well as at the conical worm section 3. In the other terminal position, the agitation or mixing position of FIG. 3, the conical shaped sections of both the worm and the mixing compartment are spaced from one another such that here the gap $d'$ is enlarged, whereas in the cylindrical sections thereof the gap $d$ remains constant.

Figure 2:
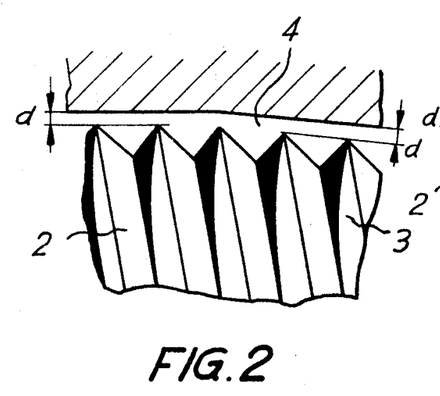
FIGS. 2 and 3 are enlarged fragmentary sectional views of the equipment of FIG. 1, showing different positions of the worm with respect to the mixing compartment.
Figure 3:
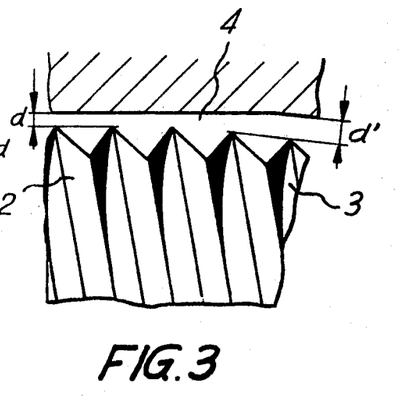

In order to obtain an optimum cleaning effect, which, of course, can be only achieved in the conical section 3 of the worm 1 and the cooperating conical section of the mixing compartment 4, such should be as large as possible with regard to the total effective worm length L. On the other hand, the cylindrical section 2 of the worm and that of the compartment only needs to encompass or extend throughout the direct region around the mouth portion of the infeed channel 5 for the material components.

The following Example represents preferred design considerations and data of the equipment :

EXAMPLE

Total length L of the worm 1 = 100 mm
Length A of the conical portion 3 = 65 mm
Length B of the cylindrical portion 2 = 35 mm
Diameter of the cylindrical portion = 24 mm
Minimum diameter of the conical portion = 18 mm
Slope of the conical portion $\alpha$ = approx. 2.5°
Thread height = 12 mm (2 threads)
Speed of rotation of the worm = 18,000 rpm
Displacement path $a$ = 7 m mm
Maximum gap width $d'$ = 0.4 mm
Minimum gap width $d$ = 0.05 mm
Velocity of movement towards one another = 0.4 m/Min.
Cleaning time = 2 sec.
Speed of moving apart = 0.8 m/Min.
Total cycle time for the cleaning operation = approx. 3.5 sec.

Figure 4:
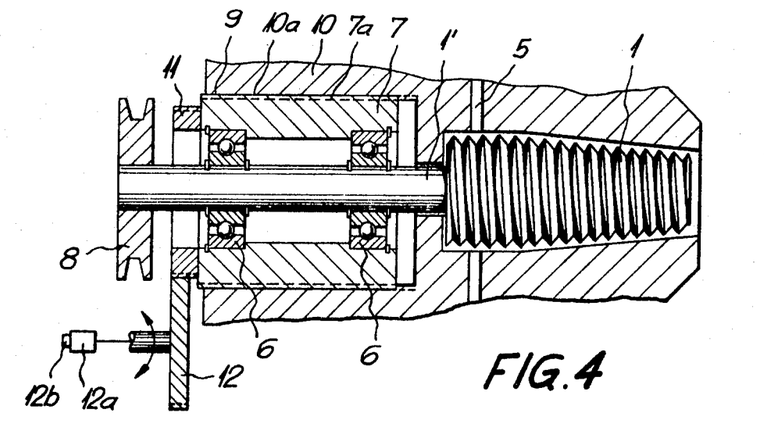
FIG. 4 is a fragmentary cross-sectional view of an adjustment mechanism for the worm.

FIG. 4 schematically illustrates apparatus for moving the worm 1 in axial direction. The shaft 1' carrying the worm 1 is rotatably mounted through the agency of ball bearings 6 in a tubular-shaped support or bearing portion 7 and carries a V-belt pulley 8 at the end thereof opposite the worm 1, as shown. By means of this V-belt pulley 8 it is possible to drive the worm 1 from a non-illustrated suitable drive mechanism. the bearing portion 7 possesses at its outer jacket surface 9 schematically depicted external threading 7a which cooperates with schematically depicted internal threading 10a of the housing section 10. At an end surface of the bearing portion 7 there is attached a concentric gear rim 11 cooperating with a ear 12, rotatable through the agency of a schematically illustrated conventional drive mechanism 12a in both directions through a predetermined angle of rotation. The rotational movement is thus transmitted from the gear 12 via the gear rim 11 to the bearing portion 7, which by virtue of the aforedescribed threading 7a, 10a during this movement simultaneously carries out a movement in axial direction. Control of the movement can be performed by terminal switches in known manner, these switches causing appropriate reversal of the direction of movement. Moreover, in order to exactly limit the terminal positions, it is possible to provide any suitable type of stop members, which for convenience in illustration have not been particularly shown in the drawings. Also, it is here-mentioned that a greatly stepped-down drive motor can be used as the drive element for the to-and-fro movement of the worm. However, actuation can also occur by means of an electromagnetic or a hydraulic or pneumatic actuation mechanism. In order to delay movement towards one another, there is advantageously provided at the drive mechanism 12a a schematically illustrated throttling mechanism 12b.

Figure 5:
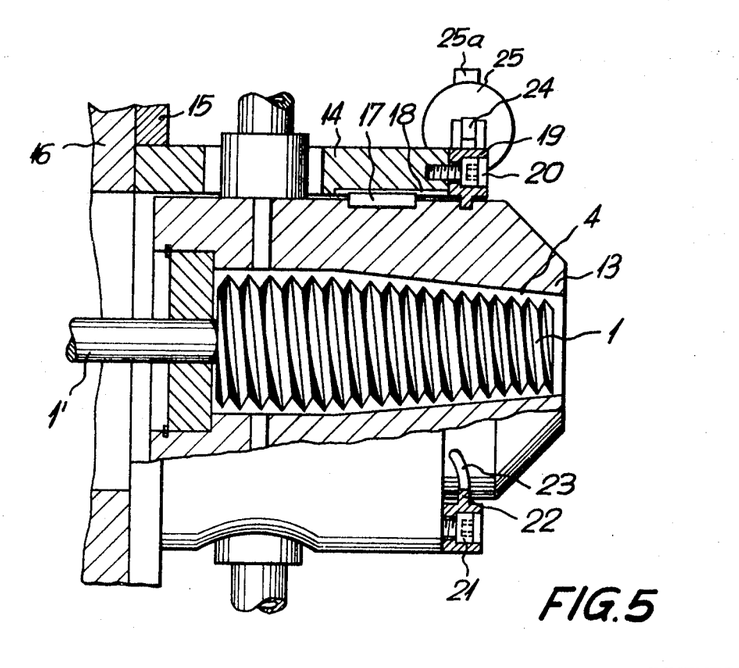
FIG. 5 is a fragmentary cross-sectional view of an adjustment mechanism for the mixing compartment.

FIG. 5 on the other hand shows an adjustment mechanism for the mixing compartment 4. Here the housing 13 of the mixing compartment 4 is retained in a tubular-shaped support element 14, which, in turn, is coupled via a flange portion 15 with the machine frame 16. A fitting spring 17 is arranged at the housing 13, spring 17 cooperating with a groove 18 at the support portion 14. Consequently, the housing 13 can carry out movement exclusively in the axial direction.

A ring member 19 is arranged at the free end face of the support portion 14, ring member 19 exhibiting a groove 20 extending in the peripheral direction. At the support portion 14 there are threaded the screws 21, the heads of which bear in the groove 20. As a result, the ring member 19 is rotatably retained at the support portion 14. Furthermore, the ring member 19 exhibits, in the direction of the housing 13, pins 22 which cooperate with curve-shaped grooves 23 of the housing 13. Now if the ring member 19 is rotated, then, due to the pins 22 and the groove 23 which is at least partially inclined in the axial direction the housing portion 13 is displaced in axial direction. A piston rod 24 of a cylinder 25 is coupled with ring member 19 and by means of which the ring member 19 can be displaced.

Figure 6:
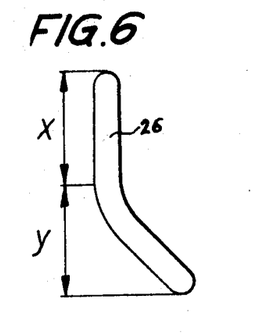
FIGS. 6 and 7 are schematic representations of control curves or cams for the above-mentioned adjustment mechanism.

As best shown by referring to FIG. 6 the groove 26 can consist of a section $x$ extending in the peripheral direction, at which merges a further section $y$ inclined with respect to section $x$. If the pin 22 is displaced by the section $y$, then the housing portion 13 moves toward the worm 1. In order to prevent a too rapid, jerky motion of the ring, and therefore the housing 13, it is advantageous if the cylinder 25 is equipped with the schematically illustrated throttling or delay mechanism 25a.

The axial movement occurs for such length of time until the pin 22 bears against the ends of the grooves 23. However, it should be apparent that it would also be possible to provide adjustable stops.

Figure 7:
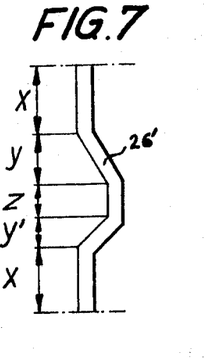

As best shown in FIG. 7, the groove 26' consists of the sections $x$ and $z$ extending in the peripheral direction as well as the inclined sections $y$ and $y'$, wherein the section $y'$ is designed to possess a greater inclination then the section $y$. The individual groove sections correspond to the following movements :

Section $x$ . . . Agitation or stirrer position
Section $y$ . . . Slow movement of worm and housing towards one another
Section $z$ . . . Cleaning position
Section $y'$ . . . Rapid moving apart of worm and housing In this case instead of using the cylinder 25 there can be provided a non-illustrated drive mechanism which cyclically moves the ring member 19 in a rotational direction.

Figure 8:
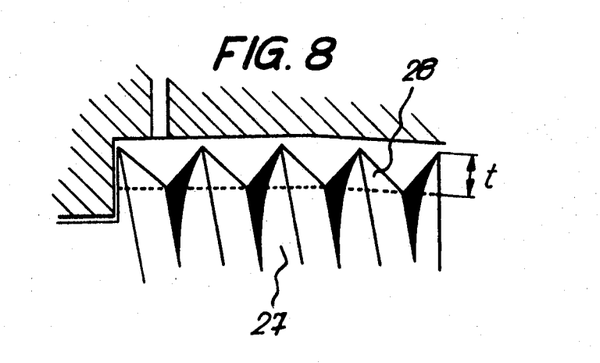
FIGS. 8 and 9 illustrate in respective fragmentary sectional views different structural forms of the worm and the worm core on an enlarged scale.

FIG. 8 illustrates a construction of worm, wherein the worm core 27 possesses a conical configuration. The threads 28 possess the same depth $t$ over the entire length of the worm.

Figure 9:
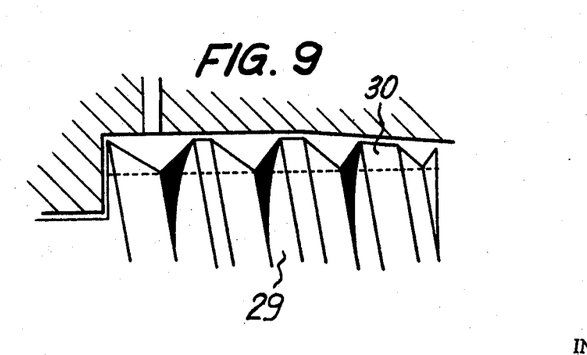

In the arrangement of FIG. 9 the conical worm has a cylinder worm core 29. The threads 30 are flattened at the region of the tip of the cone. Fabrication of such worms is very simple. A cylindrical worm must only be subsequently conically covered or ground.

Figure 10:
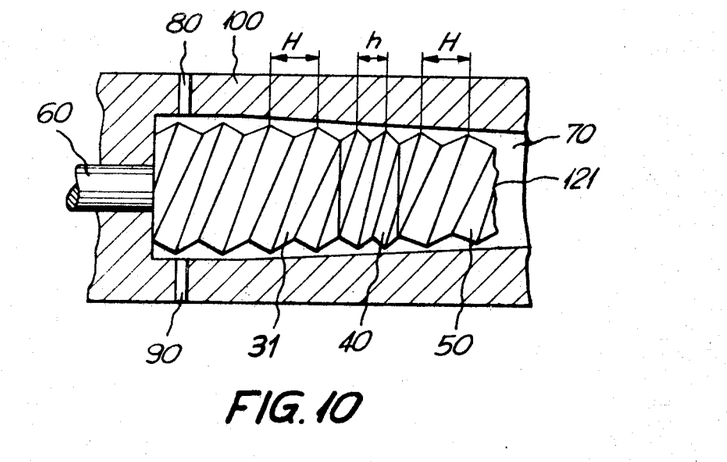
FIG. 10 illustrates a further embodiment of inventive worm arranged in a mixing compartment.

Turning now to the further embodiment of mixer equipment shown in FIG. 10, it will be seen that such comprises a housing 100 in which there is arranged a worm element 121. This worm element 121 consists of three worm sections 31, 40 and 50 arranged in succession behind one another in axial direction. Worm element 121 is furthermore coupled via a shaft 60 with any suitable non-illustrated drive mechanism. Furthermore, such worm 121 possesses a certain play with respect to the inner wall of the mixing compartment 70 arranged in the housing 100. Channels 80 and 90 for the introduction of the individual components open into the mixing compartment 70. The worm section 40 of the worm 121 will be seen to exhibit a smaller thread pitch $h$ in relation to the thread pitch $H$ of the worm sections 31 and 50.

Figure 11:
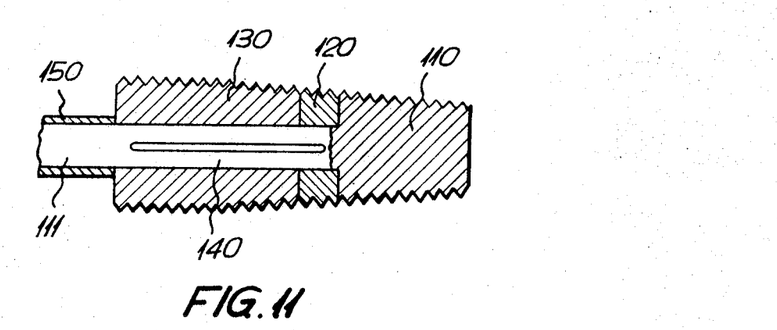
FIG. 11 is a sectional view of the worm of FIG. 10.

FIG. 11 illustrates an embodiment of inventive worm as shown in schematic cross-sectional view. The worm consists of a forward section 110 connected integrally or as one-piece with a shaft 111. On to the shaft 111 there have been pushed or mounted the remaining worm sections 120 and 130. In order to prevent relative movement of the individual sections 110, 120 and 130 with respect to one another, there is provided at the shaft 111 a fitting or mounting spring 140. The worm sections 110, 120 and 130 are retained against one another by means of a sleeve member 150 seated upon the shaft 111. Sleeve member 150 can be rigidly connected in any suitable fashion with the shaft member 111. By virtue of this arrangement it is possible to randomly exchange individual worm sections or to exchange them among themselves.

Depending upon the viscosity of the material, the rotational speed of the worm and the construction of the worm threads and the size of the gap between the worm and the mixing compartment quite different values result for the direction of movement and the velocity of the mixed material.

Thus, for instance, at one time there is obtained an optimum agitation or turbulence effect due to acceleration of the mixture, another time this effect can be achieved by braking at least a portion of the mixture.

Figure 12:
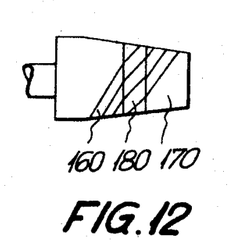
FIGS. 12, 13 and 14 are respective schematic views showing different forms of the worms for the above mixing and conveying equipment.
Figure 13:
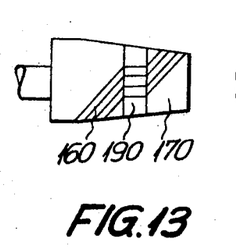

The worm construction illustrated schematically in FIG. 12 consists of the worm sections 160 and 170 possessing the same pitch, whereas the thread pitch of the central worm section 180 is larger. In this embodiment, the mixed material at the region of the section 180 is accelerated. In the embodiment according to FIG. 13 the teeth or ribs of the central section 190 are positioned parallel to the axis of the worm. Due to this extreme position there is achieved a particularly intensive mixing effect. Although the material at this region flows quite quickly, deflection of the direction of movement of the admixed material is especially large. However, with such type constructed worm, especially in the case of more viscous materials, it can happen that there occurs a very pronounced braking or daming-up of the material, and therefore, the central zone should be maintained quite short. The worm of this construction can be considerably reduced in length.

It is desirable for the material to essentially flow continuously through the mixing compartment, this continuity of movement only being interrupted at the region of the central section of the worm. To this end, there is proposed a worm in which, between two worm sections possessing the same pitch, there is arranged a section having a larger or smaller pitch. The pitch of the individual sections depends, on the one hand, upon the speed of the rotation and design of the worm, and on the other hand, upon the viscosity of the material.

Figure 14:
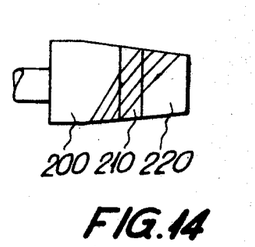

In order to shorten the injection time, the injection or infeed velocity of the material must be as high as possible. This can be achieved if a worm is employed in which, viewed in the material conveying direction of the worm, the pitch of the sections increase. In accordance with the larger pitch of the successive sections the material is accelerated in stepwise fashion, so that at the transition locations, due to deflection of the material in the direction of movement there is achieved a turbulence effect and therefore an additional mixing action. In order to shorten the injection process and therefore to achieve a rational production operation, there is oftentimes desired a high discharge velocity of the medium or mixture out of the mixing compartment. This can be realized if there is employed a worm, in which the pitch of the individual sections becomes larger in the flow direction. FIG. 14 illustrates such type worm construction. Here all three of the worm sections 200, 210 and 220 possess different thread pitch.

While there is shown and described present preferred embodiments of the invention, it is to be distinctly understood that the invention is not limited thereto, but may be otherwise variously embodied and practiced within the scope of the following claims.

What is claimed is:

1. Apparatus for mixing and conveying at least two materials, in particular a two or more component synthetic resin system, comprising means defining at least one mixing compartment having an inner wall, at least one material conveying and agitating worm means arranged in said mixing compartment, said worm means comprising a number of worm sections arranged in a row next to one another in axial direction, at least one worm section possessing threads with a different pitch than the remaining section, and the number of threads of all sections being the same, said worm means and the inner wall of said mixing compartment surrounding said worm means at least partially possessing a conical configuration, said worm means and said inner wall of the mixing compartment being spaced from one another to form a gap therebetween, said worm means being spacially fixed relative to said inner wall of said mixing compartment during the material mixing and conveying operation, and means for moving said worm means and said mixing compartment relative to one another in the axial direction to decrease the size of said gap solely for cleaning the inner wall of said mixing compartment during cleaning of the mixing compartment following a material mixing and conveying operation.

2. Apparatus for mixing and conveying at least two materials in particular a two or more component synthetic resin system, comprising means defining at least one mixing compartment having an inner wall, at least one material conveying and agitating worm means arranged in said mixing compartment, said worm means comprising a number of worm sections arranged in a row next to one another in axial direction, at least one worm section possessing threads with a different pitch than the remaining sections, the pitch of the worm sections increasing in the conveying direction of the worm means, the number of threads of all the sections being the same, said worm means and the inner wall of said mixing compartment surrounding said worm means at least partially possessing a conical configuration, said worm means and said inner wall of the mixing compartment being spaced from one another to form a gap therebetween, said worm means being spacially fixed relative to said inner wall of said mixing compartment during the material mixing and conveying operation, and means for moving said worm means and said mixing compartment relative to one another in the axial direction to decrease the size of said gap solely for cleaning the inner wall of said mixing compartment during cleaning of the mixing compartment following a material mixing and conveying operation.

3. Apparatus for mixing and conveying at least two materials, in particular a two or more component synthetic resin system, comprising means defining at least one mixing compartment having an inner wall, said inner wall of said mixing compartment being a substantially smooth-wall structure throughout its length, at least one material conveying and agitating worm means arranged in said mixing compartment, said worm means and the inner wall of said mixing compartment surrounding said worm means at least partially possessing a conical configuration, said worm means and said inner wall of the mixing compartment being spaced from one another to form a gap therebetween, said worm means being spacially fixed relative to said inner wall of said mixing compartment during the material mixing and conveying operation, and means for moving said worm means and said mixing compartment relative to one another in the axial direction to decrease the size of said gap solely for cleaning the inner wall of said mixing compartment during cleaning of the mixing compartment following a material mixing and conveying operation.

4. The apparatus as defined in claim 3, wherein said worm means includes a worm core which at least partially possesses a conical configuration.

5. The apparatus as defined in claim 3, further including infeed channel means for the material components for feeding such components into said mixing compartment, both said mixing compartment and said worm means possessing a substantially cylindrical configuration at the region of said infeed channel means.

6. The apparatus as defined in claim 3, wherein said conical configuration is inclined through an angle in a range of about 1° to about 20°.

7. The apparatus as defined in claim 6, wherein said angle of inclination is preferably in a range of about 3° to about 8°.

8. The apparatus as defined in claim 3, wherein a gap exists between worm means and said mixing compartment at said conical configuration which amounts to about 0.05 percent to about 5 percent of the average diameter of said mixing compartment.

9. The apparatus as defined in claim 8, wherein said gap amounts to about 0.2 percent to about 2 percent of the average diameter of said mixing compartment.

10. The apparatus as defined in claim 3, further including a cylindrical housing defining said mixing compartment at one end, said housing being annular at the other end, said means for performing said relative movement incorporating thread means on the interior of the annular end of said housing.

11. The apparatus as defined in claim 3, further including means for mounting said worm means, said means for performing said relative movement incorporating thread means provided at said worm mounting means.

12. The apparatus as defined in claim 3, further including a delay mechanism for controlling the relative movement of said worm means and mixing compartment towards one another.

13. The apparatus as defined in claim 3, wherein the size of the gap is substantially uniformly decreased at least at the region of the conical configuration of said worm means.

* * * * *